United States Patent Office 3,701,787
Patented Oct. 31, 1972

---

3,701,787
PREPARATION OF 5,6-DIHYDRO-5-HYDROXY-6-PROPENYL-2-PYRONE BY FERMENTATION AND DERIVATIVES THEREOF
Ralph Henry Evans, Jr., Rivervale, N.J., and Chester Eric Holmlund, Silver Spring, Md., assignors to American Cyanamid Company, Stamford, Conn.
No Drawing. Filed Mar. 5, 1969, Ser. No. 804,686
Int. Cl. C07d 7/16
U.S. Cl. 260—343.5    2 Claims

ABSTRACT OF THE DISCLOSURE

The new compound of Formula I:

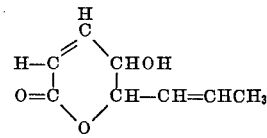

is prepared by the cultivation under controlled aerobic conditions of Nigrospora species Z1276. Compound I is acylated or etherified by chemical methods to yield the new esters or ethers of Formula II:

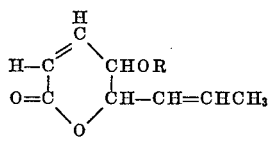

wherein R is an acyl radical such as acetyl, propionyl, p-nitrobenzoyl or succinoyl; or an ether radical such as a lower alkyl group, e.g., methyl, ethyl or propyl. All the compounds of this invention have antimicrobial activity. The compound of Formula I also has anti-inflammatory activity.

---

This invention relates to new chemical compounds having antimicrobial and anti-inflammatory activities; and to fermentative and synthetic methods for preparing these compounds.

The invention is, in one aspect, based upon the discovery that the cultivation under controlled conditions, of a previously unisolated strain of fungus of the genus Nigrospora leads to the formation of a new antimicrobially active culture medium. Another aspect of this invention resides in the finding that the active culture medium can be worked up to yield a new compound, which has antimicrobial and anti-inflammatory activity. Still another aspect of the present invention is the chemical conversion of said new compounds to acyl or ether derivatives which also exhibit the useful antimicrobial activity noted above. Other aspects of this invention will be apparent from the ensuing description thereof.

The novel compounds of the present invention may be represented by the following general Formulae (I–II)

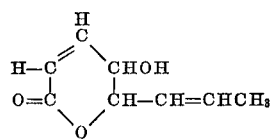

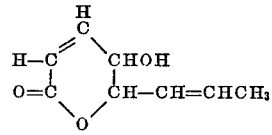

wherein R is acyl such as acetyl, propionyl, p-nitrobenzoyl or succinoyl; or lower alkyl such as methyl, ethyl or propyl. The new compound of Formula I is formed during cultivation under controlled conditions of a species of the genus Nigrospora which has been given the identification number Z1276. The organism was isolated from a soil sample collected in Jamaica. A viable culture of the organism has been deposited with the Culture Collection Laboratory, Northern Utilization Research and Development Division, U.S. Department of Agriculture, Peoria, Ill. and has been added to its permanent collection. It is freely available in this repository under its Accession Number NRRL 3375.

DESCRIPTION OF THE ORGANISM

The following is a general description of the organism based on observed diagnostic characteristics. The descriptive colors are taken from Jacobson et al., "Color Harmony Manual," 3rd ed. (1948).

The organism is a higher fungus isolated from a soil sample collected in Jamaica. It grows readily on a variety of artificial media at 20–25° C. In the study of the taxonomic aspects of the culture, Petri dishes of potato-dextrose, malt extract, cornmeal and Czapek's solution agars were inoculated and incubated at ambient room temperature for 30 days. Observations of cultural and morphological characteristics are recorded in the description below.

Colonies on potato-dextrose agar spread rapidly and cover the entire Petri dish in 7 days. Mycelial mat flat, loose, Ivory (2db), uniform in appearance over entire surface and somewhat fasciculate in age. Reverse is Buff (2fb).

On malt agar, colonies spread rapidly covering the entire Petri dish in 7 days. Mycelial mat is compact and heavy, Ivory (2db) and uniform in appearance over entire surface. Mycelium became fasciculate in older portions. Colony reverse is Amber (3nc). Few spores after 30 days incubation.

Colonies spread slowly on cornmeal agar, eventually covering agar surface of Petri dish in about 30 days. Mycelial development was very thin, colorless and delicate. No spores were produced.

On Czapek's solution agar, colonies spread slowly and require about 30 days to cover the Petri dish. Mycelial mat was compact, Ivory (2db). Colony margins were thin and effuse. Individual hyphal elements tended to coil at terminus. Mycelium in central colony zones was richly septate and tended to become fasciculate. Reverse Bamboo (2gc) in central zones and of lighter shade in marginal areas. There was no appreciable sporulation in 30 days.

Aerial mycelium hyaline, septate and gives rise to dark brown to black spores borne on short side branches. Spores subglobose, smooth, one-celled and range from 12μ to 25μ in diameter, average 15μ.

The characteristics observed for the fungus Z-1276 place it in the genus Nigrospora of the order Moniliales. It is to be understood that for the production of the above-identified novel compounds, the present invention is not limited to the use of this particular organism or to organisms fully answering the above growth and microscopic characteristics which are given for illustrative purposes. In fact, it is desired and intended to include the production of these compounds through the use of mutants produced from the described organism by various mutating means, such as by x-radiation, ultraviolet radiation, nitrogen mustard, and the like.

The fermentation process

Cultivation of Nigrospora species Z1276 may be carried out in a wide variety of liquid culture media. Media which are useful for the production of the novel compounds including an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc., are supplied as impurities of other constituents of the media. Aeration in tanks and bottles is provided by forcing sterile air through or onto the surface of the fermenting medium. Agitation in tanks is provided by a mechanical impeller. An antifoaming agent, such as lard oil may be added as needed.

Inoculum preparation

Shaker flask "seed" inoculum is prepared by inoculating 100 milliliter portions of sterile liquid medium in 500 milliliter flasks with scrapings or washings of spores from an agar slant of the culture. The following medium is ordinarily used.

| | Grams |
|---|---|
| Soybean flour | 10 |
| Cerelose | 20 |
| Corn steep liquor | 5 |
| Calcium carbonate | 3 |
| Water to 1,000 milliliters. | |

The flasks are incubated at a temperature from 25-29° C., preferably 28° C., and agitated vigorously on a rotary shaker for 30 to 48 hours. These 100 milliliter portions of seed inoculum are used to inoculate one liter and twelve liter batches of the same medium in 2 liter and 20 liter glass fermentors. The inoculum mash is aerated with sterile air while growth is continued for 30 to 48 hours. These batches of inocula in turn are used to inoculate tank fermentors.

Tank fermentation

For the production of the compound of Formula I in tank fermentors, the following fermentation medium is preferably used.

| | Grams |
|---|---|
| Molasses | 20 |
| Cerelose | 10 |
| Bacto-peptone | 5 |
| Water to 1,000 milliliters. | |

Before sterilization, pH is adjusted with NaOH to pH 7-7.2. Each tank is inoculated with 3 to 10% of inoculum made as described above. Aeration is supplied at the rate of 0.5-1.0 liter of sterile air per liter of broth per minute and the fermenting mixture is agitated by an impeller driven at 200-800 r.p.m. The temperature is maintained at 25-29° C., usually at 28° C. The fermentation is ordinarily continued for 90-165 hours, at which time the mash is harvested.

Isolation procedure

After the fermentation is completed, the fermented mash containing the novel compound of Formula I is adjusted to about pH 2.5 to 3.5 with mineral acid. The mixture is filtered with a filter aid, to remove mycelium and the filter cake is washed with a small portion of water. The combined filtrate and wash are twice extracted with a water immiscible polar solvent such as ethyl acetate or methylene chloride using about 500 ml. of solvent per liter of filtrate extraction. The two extracts are pooled and concentrated under reduced pressure to an oil-like residue. A column charge is prepared by dissolving the residue in acetone or some other suitable solvent, as for example, diethylether or methylene chloride, adding sufficient silica gel to absorb the mixture and removing the solvent by evaporation under reduced pressure to about 50° C. The dry charge is placed onto a silica gel column slurry packed with hexane, and the column is developed successively with a gradient between equal volumes of hexane and methylene chloride and followed with a gradient between methylene chloride and 15% methanol in methylene chloride. The column effluent, continuously monitored using percent transmission at about 210-220 m$\mu$, is collected in separate fractions of suitable volume. A total of approximately 10 holdback-volumes is needed to elute the described novel compound produced by the fermentation.

The percent transmission at about 210-220 m$\mu$ indicates the peak which corresponds to the novel compound. The effluent fractions corresponding to this peak are pooled and concentrated under reduced pressure yielding the crude compound as a slightly yellowish oil. The crude compound is purified by conventional techniques including vacuum distillation, partition column chromatography or adsorption chromatography on Florisil or another suitable adsorbant. The pure compound has a melting point of 50-53° C. and an optical rotation of $[\alpha]_D^{25} = +175°$ (c.=1.937 in chloroform).

Chemical conversion

The compound of Formula I can be converted to the compounds of Formula II by straightforward acylation or alkylation procedures. Thus the compound to be acrylated is mixed with an equimolar amount of the anhydride or chloride corresponding to the acyl radical which is desired, preferably in the presence of an organic base such as pyridine. The resulting solution is allowed to stand, or is optionally heated to hasten reaction. It is then neutralized, cooled and extracted with a solvent. The extract containing the desired compound is washed with dilute acid, water, dried and concentrated to a residue from which the desired acrylated compound, in pure form, can be obtained by recrystallization and chromatographic methods.

Alternatively, the compound of Formula I can be etherified by conventional means to yield the compound of Formula II wherein R is an alkyl group. Typically usable for this purpose are alkylating agents such as lower alkyl iodides or bromides. The reaction is conducted in the presence of a solvent such as a liquid halocarbon (e.g., chloroform) and a base to act as a halogen acceptor (e.g., silver oxide). The reaction proceeds at room temperature. After the reaction period, e.g., 24 hours, the desired ether is recovered from the filtrate by removing the solvent in vacuo. The products are either crystalline solids or oils.

Properties and uses

Ethyl acetate extracts of the fermentation mash of culture Nigrospora Z-1276 significantly inhibit the growth of the protozoan *Tetrahymena pyriformis*. Table I below shows the activity of the novel compound and its acetate against *Tetrahymena pyriformis*.

*In Vitro* Activity Against the Protozoan
*Tetrahymena pyriformis*

| Test compound: | Concentration needed for 50% inhibition, γ/ml. |
|---|---|
| Compound of Formula I | 2 |
| Acetate of compound of Formula I | 5 |

Additionally, the compound of Formula I exhibited activity against *Mycoplasma gallisepticum*, a pleuropneumonia-like organism (PPLO), in chick embryos at non-toxic dose levels (0.06 mg./embryo).

Table II, following, shows the antibacterial and antifungal activity of both of the above compounds against a variety of bacteria and fungi using the agar dilution-streak test procedure.

TABLE I

TABLE II

Antibacterial and antifungal activity of the compound of Formula I and its acetate

[Minimal inhibitor concentrations in μg./ml.] [1]

|  | Compound of Formula I | Acetate |
|---|---|---|
| Bacteria | | |
| *Proteus vulgaris* ATCC 9484 | 125 | 62 |
| *Escherichia coli* Upjohn culture 311 | 250 | >250 |
| *Escherichi coli* DY | 250 | >250 |
| *Klebsiella pneumoniae* 53 AD | 125 | 250 |
| *Enterobacter aerogenes* 75 | 250 | >250 |
| *Mycobacterium smegmatis* ATCC 607 | >250 | 125 |
| *Staphylococcus aureus* St. Rose ATCC 14154 | >250 | 250 |
| *Staphylococcus aureus* St. Smith ATCC 13709 | >250 | 250 |
| *Staphylococcus aureus* 69 |  | 250 |
| *Sarcina lutea* ATCC 9341 |  | 250 |
| *Streptococcus pyogenes* C203 | 250 | 125 |
| *Bacillus cereus* 10702 |  | 125 |
| *Salmonella gallinarum* 604 |  | 250 |
| *Salmonella typhosa* ATCC 6539 | 125 | 250 |
| Fungi: | | |
| *Candida albicans* E83 | >250 | >250 |
| *Crytococcus neoformans* E138 | >250 | >250 |
| *Trichophyton tonsurans* E10 | 62 | 6.2 |
| *Trichophyton mentagrophytes* E11 | 125 | 62 |
| *Trichophyton rubrum* E97 | 125 | 62 |
| *Microsporum canis* E55, ATCC 10214 | >250 | 62 |
| *Microsporum gypseum* ATCC 14683 | 125 | 31 |

[1] Agar dilution-streak method.

The compound of Formula I has been found to exhibit anti-inflamatory activity in rats when administered orally in dosages of 250 mg./kg. in a test involving carrageenin induced edema. In this test weanling Sherman strain rats ranging in weight from 50–55 grams were used and fed standard laboratory diet ad libitum. The test compound was administered to the rats by gavage (250 mg./kg. in a volume of 1.7 ml. of buffered starch) one hour prior to challenge with carrageenin. The challenge agent, carrageenin, was obtained from Marine Colloids, 2 Edison Place, Springfield, N.J. and prepared as a sterile 1% suspension in 0.9% sodium chloride. A volume of 0.05 milliliters was injected using a 26-gauge needle into the plantar tissue of the rats right hind paw of treated and untreated rats. Measurements of the volumes of the carrageenin inflamed right (challenged) paw and left (unchallenged) paw were determined 4 hours subsequent to the carrageenin challenge. The method of determining paw volumes was carried out essentially as described by C. A. Winter et al., in Proc. Soc. Exptl. Biol. Med. 111: 544–547 (1962) using mercury immersion. The differences in volume between the two paws of each rat was considered to be the volume of the carrageenin induced edema. The data observed on running four such tests are summarized in Table III below. The mean edema volume of eight control rats divided by the mean edema valume of two treated rats is calculated in the last column of Table III and designated as the C/T efficacy ratio.

A compound is considered active in this test if the mean C/T efficacy ratio of 2 consecutive tests is equal or greater than 1.43.

TABLE III

Anti-inflammatory activity of the compound of Formula I on carragenin induced edema in the rat

| No. | Treatment | No. of rats | Dosage mg./kg. | Mean edma vol (cc.) | C/T efficacy ratio control/treated |
|---|---|---|---|---|---|
| Test 1 | Control | 8 |  | 0.458 | 3.32 |
|  | Compd. I | 2 | 250 | 0.138 |  |
| Test 2 | Control | 8 |  | 0.372 | 1.87 |
|  | Compd. I | 2 | 250 | 0.199 |  |
| Test 3 | Control | 8 |  | 0.409 | 5.93 |
|  | Compd. I | 2 | 250 | 0.069 |  |
| Test 4 | Control | 8 |  | 0.381 | 3.66 |
|  | Compd. I | 2 | 250 | 0.104 |  |

Further, both the acetate and propionate ester of Compound I have been found to have significant activity against *Microsporum canis* when tested as topical antifungal agents on guinea pigs. In this test albino, male guinea pigs, Hartley strain, 300–500 grams were infected dermally with 0.5 milliliter of a 1 to 10 dilution of a standard *M canis* infective hair suspension, onto a prepared site on the left side of each guinea pig. The infective hair suspension was prepared by the following procedure: Guinea pigs infected with 0.5 ml. of an undiluted or a 1 to 10 dilution of suspension from a preceding passage served as donors of infected hairs. Virulence of the infecting organism was maintained by animal to animal passage. At a time from 7 to 14 days post-infection, but normally on the 14th day, hairs were pulled from the infected area and examined for fluorescence under ultraviolet light. Only hairs showing intense fluorescence at the root were selected. The selected hairs were weighed and ground into suspension in sufficient diluent to give a final concentration of 3 milligrams of hair per milliliter of diluent. The diluent used was Sabouraud's medium (1% enzymatic protein digest and 2% dextrose), medicated by addition of 100 micrograms per milliliter of potassium penicillin G and 100 micrograms per milliliter of dihydrostreptomycin sulfate. This hair suspension is identified as undiluted stock hair suspension. Each stock hair suspension was examined for purity, and its content of viable organisms (spores) was determined by seeding 10-fold dilutions in agar plates containing 1% enzymatic protein digest, 1% dextrose, 1.5% dehydrated fresh oxbile preparation, 2% agar and 0.001% crystal violet and incubating for 7 days at 30°±2° C. Before the inoculum was applied, the hair was cut with an electric clipper and the shorn area cleared of hair debris and scurf with a couple of brisk strokes with a fiber hand brush. The inoculum was applied with a pipette. The tip of the pipette containing a single dose was pressed against the guinea pig skin and was then moved in a circular path completely covering an area of about 3 centimeters in diameter until the entire dose had been thoroughly rubbed into the skin. There was no run-off of inoculum at the completion of inoculation, and the inoculated area appeared reddened from the continuous excoriating action of the pipette tip. The application of inoculum took approximately one minute per guinea pig.

The test compounds were incorporated into ointments at concentrations indicated in Table IV in a mixture of two polyethylene glycols, one having a molecular weight averaging about 400 and the other about 4000. Griseofulvin, a known antifungal agent, was incorporated into the same ointment base at a 1% concentration and used as a positive control. After inoculation, test animals were treated once daily by rubbing the drug-containing compositions into the infected area. Untreated controls were treated with appropriate vehicles containing no drug.

Four tufts of hair, one from each of four equidistant spots on the periphery of the infected area, were plucked and macerated in 5 milliliters of medicated Sabouraud's medium. Maceration was achieved by grinding the hairs with a motor-driven stainless steel pestle. The pestle was cleansed between samples by wiping with isopropyl alcohol. One-half milliliter of the resulting suspension was seeded in agar plates containing 1% enzymatic protein digest, 1% dextrose, 1.5% dehydrated fresh oxbile preparation, 2% agar, and 0.001% crystal violet. The plates were examined for typical *Microsporum canis* growth after incubation for 7 days at 30°±2° C. The amount of growth was rated as follows:

no colonies=0
1–10 colonies=+
11–100 colonies=++
101–1,000 colonies=+++
More than 1,000 colonies=++++

Table IV, below, lists the combined results of a number of such tests. Numbers in parentheses indicate the number of animals used.

TABLE IV

| Concentration, percent | Preparation tested | Hair culture score | |
|---|---|---|---|
| | | 10 [1] | 17 [1] |
| 1 | Compound I acetate (2) | ++ | +++ |
| 5 | Compound I acetate (6) | + | ++ |
| 5 | Compound I propionate (4) | ++ | +++ |
| 1 | Griseofulvin (5) | + | ++ |
| | Untreated control (5) | ++++ | ++++ |

[1] Relative concentration of viable organisms per hair sample scored on the 10th and 17th day postinfection.

The following examples are presented to illustrate this invention

EXAMPLE 1

Inoculum preparation

The medium used to grow the primary inoculum is prepared according to the following formula:

|  | Grams |
|---|---|
| Soy bean flour | 10 |
| Cerelose | 20 |
| Corn steep liquor | 5 |
| Calcium carbonate | 3 |

Water to 1,000 milliliters.

The washed or scraped spores from an agar slant of a Nigrospora fungus were used to inoculate one 500 ml. flask containing 100 milliliters of the above medium. The flask was placed on a rotary shaker and agitated vigorously for 48 hours, at 28° C. The resulting flask inoculum was transferred to a 2 liter glass fermentor containing 1 liter of sterile medium. The glass fermentor was aerated with sterile air while growth was carried out for about 48 hours, after which the contents were used to seed a 30 l. tank fermentor.

EXAMPLE 2

Fermentation

A fermentation medium is prepared according to the following formula:

|  | Grams |
|---|---|
| Molasses | 20 |
| Cerelose | 10 |
| Bacto-peptone | 5 |

Water to 1,000 milliliters.

Before sterilization, pH is adjusted with NaOH to pH 7–7.2.

The fermentation medium was sterilized at 120° C. with steam at 20 pounds pressure for 45–60 minutes. The pH of the medium after sterilization was 5.8. Thirty liters of sterile medium in a 40 liter tank fermentor was inoculated with 1 liter inoculum, prepared as described in Example 1, and the fermentation was carried out at 28° C. using Hodag LG-8 oil as a defoaming agent. Aeration was supplied at the rate of 0.7 liter of sterile air per liter of mash per minute. The mash was agitated by an impeller driven at 800 revolutions per minute. At the end of approximately 162 hours of fermentation time, the mash was harvested.

EXAMPLE 3

Isolation procedure

Twenty-four liters of fermentation mash (pH 5.8) were adjusted to pH 3.0 with hydrochloric acid and clarified by filtration using Hyflo®. The filter pad was washed with about 4 liters of water and the combined filtrate and wash were extracted with two one-half volumes of ethyl acetate. The combined extracts were concentrated under reduced pressure to an oily residue (18.3 g.). Sufficient acetone was added to dissolve the residue and 50 grams of silica gel was added. The solvent was removed under reduced pressure at about 50° C. and this dry charge was added to the top of a column containing 500 grams of silica gel slurry-packed in hexane. The column was developed with a gradient between 4 liters each of hexane and methylene chloride followed by a gradient between 4 liters each of methylene chloride and 15% methanol-in-methylene chloride. The effuent was monitored using percent transmission at 220 m$\mu$ and separate fractions of about 80 milliliters each were collected. The fractions of effluent containing the novel compound were combined and concentrated under reduced pressure to a yellow oil (6.8 g.).

A portion of this oil (1.98 g.) was purified by means of partition column chromatography on 500 g. of Celite®. The column support was prepared by mixing 0.5 milliliter of the lower phase of the solvent system comprising water-methanol-dioxane-cyclohexane (1:1:3:5) with each 1 gram of Celite®. About 20 grams of Celite® was added to the oil dissolved in 10 milliliters of lower phase. The charge was packed onto the top of the prepared column and the column was eluted with about 14 hold-back-volumes of upper phase. The effluent was monitored using percent transmission at 225 m$\mu$. The peak corresponding to compound I was concentrated under reduced pressure to an oil which, upon standing, crystallized M.P. 50–53° C., wt. 350 milligrams, optical rotation $[\alpha]_D^{25}=+175°$ (c.=1.937 in chloroform).

EXAMPLE 4

Preparation of acetate of Compound I

To 10 milliliters of acetic anhydride was added 5.8 grams of Compound I (oily material) and 0.1 grams of sodium acetate. After 72 hours, the reaction mixture was diluted with cold water and extracted with an equal volume of diethyl ether. The extract was concentrated under reduced pressure to a highly colored oil. This oil was dissolved in methylene chloride containing 10% ether and filtered through 125 grams of silica gel. The filtrate was concentrated to a nearly colorless oil (4.3 grams) which was dissolved in 500 milliliters of 1% acetone in hexane and added to the top of a column containing 1500 grams of Florisil slurry packed in hexane. The column was developed with a gradient between 8 liters each of 5% acetone-in-hexane and 25% acetone-in-hexane. The acetate, detected by thin layer chromatography of various fractions, was eluted after passage of about 3.3 hold-back-volumes through the column. The fractions containing the acetate were combined and concentrated under reduced pressure to a crystalline solid: M.P. 54.5–55.5° C., wt. 2.25 grams, optical rotation $[\alpha]_D^{25}+358°$ (c.=0.316 in chloroform).

EXAMPLE 5

Preparation of propionate of Compound I

Two grams of Compound I (oily material) was dissolved in 5 milliliters of pyridine to which 5 milliliters of propionic anhydride was added. At the end of 18 hours the reaction mixture was diluted with cold aqueous hydrochloric acid and extracted with diethyl ether. The ethereal extract was washed twice with 1 N hydrochloric acid, then with water, dried over anhydrous sodium sulfate, and concentrated under reduced pressure to an oil. The oil was chromatographed on a Florisil column (150 grams) developed with a gradient between 2 liters each of 5% acetone-in-hexane and 30% acetone-hexane. The

EXAMPLE 8

The esters of the present invention (compound of Formula II wherein R is an acyl group) exhibit significant antifungal activity as evidenced by the test results presented in Table V.

TABLE V

| Organism | Minimal inhibitary concentration in µg./ml. | | | |
|---|---|---|---|---|
| | $COCH_2$ | $COCH_2CH_2$ | $COOH(CH_2)_3-CO$ | $P-NO_3$ benzoate |
| Candida albicans | — | — | — | — |
| Cryptococcus neoformans | — | — | — | — |
| Trichophyton tonsurans | 6.2 | 2.5 | 250 | 6 |
| Trichophyton mentagrophytes | 31 | 25 | — | — |
| Trichophyton rubrum | 31 | 25 | — | — |
| Microsporum canis | 31 | 25 | — | — |
| Microsporum gypseum | 15 | 25 | — | 12 |
| Phialophora jeanselmei | — | 125 | — | — |
| Epidermophyton floccosuum | n | 6 | 250 | 62 |
| Microsporum audouini | n | 6 | 25 | 12 |

[1] Agar dilution streak method.
Key: — = >250 µ/ml.; n=not tested.

propionate ester was eluted with about 8% acetone-in-hexane. Concentration of appropriate fractions yielded an oil which slowly crystallized on standing: M.P. 48–50° C., weight 2.01 grams, optical rotation $[\alpha]_D^{25} + 264°$ (c.=0.680 in methanol), $\lambda_{max}^{MeOH}$ 204 mµ (ε=11,350)

EXAMPLE 6

Preparation of hemisuccinate of Compound I

Two grams of Compound I (oily material) was dissolved in 5 milliliters of pyridine to which 2.0 grams of succinic anhydride was added. After 18 hours the reaction mixture was diluted with aqueous acid and extracted with diethyl ether. The ethereal extract was washed twice with 1 N hydrochloric acid, then with water, dried over anhydrous sodium sulfate, and concentrated under reduced pressure to an oil. The oil was chromatographed on a silica gel column (200 grams) developed with a gradient between 2 liters each of 1% acetic acid in methylene chloride and methanol-acetic acid-methylene chloride (5:1:94). Concentration of appropriate fractions yielded the hemisuccinate as an oil, $\lambda_{max}^{MeOH}$ 204 mµ (ε=10,675)

EXAMPLE 7

Preparation of p-nitrobenzoate of Compound I

Two grams of crude Compound I (oily material) was dissolved in 4 milliliters of pyridine to which 5 grams of p-nitrobenzoyl chloride was added. The reaction mixture was heated for 1 hour on a steam cone after which time it was cooled and diluted with cold, aqueous hydrochloric acid and extracted with diethyl ether. The extract was washed twice with 1 N hydrochloric acid, then with water and dried over anhydrous sodium sulfate. The dried extract was concentrated under reduced pressure to a small volume wherein crystals were formed. The crystals were removed by filtration and discarded. The filtrate was concentrated to a residue which was chromatographed on a silica gel column (300 grams) and developed with a gradient between 2 liters each of methylene chloride and 15% diethyl ether in methylene chloride. Appropriate fractions of eluate were concentrated to a small volume. Hexane was added precipitating the crystalline p-nitrobenzoate which was separated by filtration, M.P. 163–165° C.

EXAMPLE 9 o-Methyl ether

Compound I (2.0 g.) in chloroform containing 6.0 g. of silver oxide and 5 ml. of methyl iodide was stirred at room temperature for 24 hours. After filtration, the solvent was removed in vacuo and the pale yellow oil distilled at 100°/50µ to give 1.85 g. of a colorless oil which crystallized on standing, M.P. 34–35°

$[\alpha]_D = +209°$ (c., 0.554 in methanol), molecular weight 168 by mass spectrometry consistent with $C_9H_{12}O_3$.

EXAMPLE 10 n-Propyl ether

Compound I (2.0 g.) in chloroform was treated with 3.5 ml. of n-propyl iodide and 6.0 g. of silver oxide and the mixture stirred and refluxed for about three days. The solution was filtered and concentrated to dryness. Chromatography over acid-washed Florisil (200 g.) and elution with a gradient between 7% acetone in hexane and 25% acetone in hexane gave 1.1 g. of the n-propyl ether. Distillation at 129°/60µ gave the analytical sample as an almost colorless oil $[\alpha]_D + 215°$ (c.=0.436 in MeOH) molecular weight 196 by mass spectrometry consistent with $C_{11}H_{16}O_3$.

The ethyl-ether was prepared in the same manner as described for the n-propyl ether by using ethyl iodide in place of n-propyl iodide $[\alpha] + 211°$ (c.=0.156 in MeOH), B.P. 129°/80µ, molecular weight 182 by mass spectrometry.

EXAMPLE 11

The lower alkyl derivatives (for example, methyl, ethyl, and n-propyl) exhibit significant activity against a variety of fungi both in vitro and in vivo.

The in vitro antifungal activity of the methyl, ethyl, and n-propyl ethers is presented in Table VI. Table VI shows the minimal inhibitory concentration of the derivatives required to inhibit the growth of representative microorganisms in a nutrient media. The O-methyl compound of Formula II possessed a high degree of in vivo antifungal activity against experimental infections of *Microsporum canis* in guinea pigs while O-ethyl and O-propyl compounds showed significant activity against *Microsporum canis* as well as *Trichophyton mentagrophytes* in guinea pigs. This activity indicates the compounds to be useful as medicaments in the treatment and control of fungal infections and related disorders.

TABLE VI

In vitro antifungal activity minimal inhibitory concentrations (μg./ml.)

| Organisms | O-methyl | O-ethyl | O-n-propyl |
|---|---|---|---|
| Trichophyton tonsurans E10 | 15 | 100 | 10 |
| Trichophyton mentagrophytes E11 | 62 | 100 | 25 |
| Trichophyton rubrum E97 | 62 | 100 | 50 |
| Microsporum canis E55, ATCC 10214 | 62 | 100 | 25 |
| Microsporum gypseum ATCC 14683 | 62 | 100 | 25 |
| Phialophora jeanselmei | 250 | | |
| Proteus vulgaris [1] | 100 | 100 | 100 |

[1] Bacterium.

What is claimed is:

1. The compound of the formula:

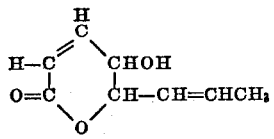

2. A compound of the formula:

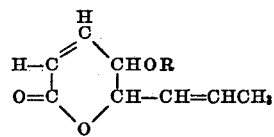

wherein R is acetyl, propionyl, p-nitrobenzoyl, succinoyl, methyl, ethyl or propyl.

References Cited

Chem. Abstracts, vol. 45, July-September 1951, 711 4b relied on.

ALEX MAZEL, Primary Examiner

A. M. T. TIGHE, Assistant Examiner

U.S. Cl. X.R.

425—279; 195—82